US 11,995,003 B2

(12) United States Patent
Zhang et al.

(10) Patent No.: US 11,995,003 B2
(45) Date of Patent: May 28, 2024

(54) METHOD OF DATA CACHING AND DEVICE CACHING DATA

(71) Applicant: SAMSUNG ELECTRONICS CO., LTD., Suwon-si (KR)

(72) Inventors: Heng Zhang, Shaanxi (CN); Yinxin Zhao, Shaanxi (CN)

(73) Assignee: SAMSUNG ELECTRONICS CO., LTD. (KR)

( * ) Notice: Subject to any disclaimer, the term of this patent is extended or adjusted under 35 U.S.C. 154(b) by 37 days.

(21) Appl. No.: 17/516,007

(22) Filed: Nov. 1, 2021

(65) Prior Publication Data

US 2022/0253388 A1    Aug. 11, 2022

(30) Foreign Application Priority Data

Feb. 5, 2021   (CN) .......................... 202110163068.1

(51) Int. Cl.
*G06F 12/1045* (2016.01)
*G06F 12/02* (2006.01)
*G06F 12/0868* (2016.01)

(52) U.S. Cl.
CPC ...... *G06F 12/1054* (2013.01); *G06F 12/0238* (2013.01); *G06F 12/0292* (2013.01); *G06F 12/0868* (2013.01); *G06F 2212/7201* (2013.01)

(58) Field of Classification Search
None
See application file for complete search history.

(56) References Cited

U.S. PATENT DOCUMENTS

| 9,697,116 | B2 | 7/2017 | Kim et al. | |
| 10,430,117 | B2 | 10/2019 | Jean | |
| 10,558,393 | B2 | 2/2020 | Shin et al. | |
| 2005/0081009 | A1* | 4/2005 | Williams | G06F 3/0659 711/163 |
| 2016/0266797 | A1* | 9/2016 | Nagaraj | G06F 16/176 |
| 2020/0133571 | A1 | 4/2020 | Kim et al. | |
| 2020/0226072 | A1* | 7/2020 | Kang | G06F 12/10 |
| 2020/0264982 | A1* | 8/2020 | Byun | G06F 12/10 |
| 2023/0033029 | A1* | 2/2023 | Aguilera | G06F 12/0811 |

FOREIGN PATENT DOCUMENTS

| CN | 104571951 B | 4/2018 |
| CN | 110781106 A | 2/2020 |
| TW | 201923609 A | 6/2019 |

* cited by examiner

*Primary Examiner* — Charles Rones
*Assistant Examiner* — Ryan Dare
(74) *Attorney, Agent, or Firm* — Fish & Richardson P.C.

(57) ABSTRACT

A method of data caching includes; determining a process corresponding to a read request communicated from a host, obtaining historical access information for the process according to historical process information stored in a cache, wherein the historical process information includes at least one of historical access information for the process and heat information for one or more regions historically accessed by the process, determining a first region historically accessed by the process according to the historical access information, such that heat information for the first region satisfies a first preset condition, and loading a physical address for the first region from a storage device to the cache.

20 Claims, 8 Drawing Sheets

METHOD OF DATA CACHING AND DEVICE CACHING DATA

BACKGROUND

The inventive concept relates generally to data storage devices and methods. More particularly, the inventive concept relates to methods for data caching and devices performing data caching.

A host (e.g., an Android phone) storing data according to a Universal Flash Storage (UFS) must read data from the UFS during a defined runtime. The speed at which data is read in relation to the UFS directly affects runtime. This is particularly noteworthy during the launch of large application, such as games.

Accordingly, a combination of the UFS and a so-called "host performance booster" (or HPB) has been proposed to improve read performance. Although this approach provides improved read speed, other problems (e.g., low read ratio by the HPB, wasted cache resources, etc.) arise which may adversely affect overall read performance.

SUMMARY

Embodiments of the inventive concept provide methods of data caching and a corresponding devices performing data caching that address the foregoing problems.

According to an aspect of the inventive concept a method of data caching includes; determining a process corresponding to a read request communicated from a host, obtaining historical access information for the process according to historical process information stored in a cache, wherein the historical process information includes at least one of historical access information for the process and heat information for one or more regions historically accessed by the process, determining a first region historically accessed by the process according to the historical access information, such that heat information for the first region satisfies a first preset condition, and loading a physical address for the first region from a storage device to the cache.

According to an aspect of the inventive concept a device performing data caching includes; a process management unit configured to determine a process corresponding to a read request received from a host, obtain historical access information for the process corresponding to the read request according to historical process information stored in a cache, wherein the historical process information includes historical access information for at least one process, and the historical access information includes heat information for one or more regions historically accessed by the process, determine a first region historically accessed by the process for which heat information satisfies a first preset condition in accordance with the historical access information for the process, and a cache management unit configured to load a physical address for the first region from a storage device to the cache.

According to an aspect of the inventive concept a method of data caching in a system including a Universal Flash Storage (UFS), a cache and a host includes; loading historical process information from the UFS to the host upon power-on of the host; wherein the historical process information includes heat information, determining a process corresponding to a read request communicated by the host, obtaining historical access information for the process according to the historical process information, determining a first region historically accessed by the process according to the historical access information, such that heat information for the first region satisfies a first preset condition, communicating a physical address for the first region from the UFS to the cache, and communicating a table correlating logical addresses and physical addresses between the host and the UFS.

BRIEF DESCRIPTION OF THE DRAWINGS

The above and other objectives and features associated with embodiments of inventive concept will be better understood upon consideration of the following detailed description together with the accompanying drawings, in which.

DETAILED DESCRIPTION

Certain embodiments will now be described in some additional detail to teach the making and use of the inventive concept. However, those skilled in the art will appreciate that many changes and modifications to the disclosed methods, devices, and/or systems are possible.

Unless defined otherwise, all terms (including technical terms and scientific terms) used herein have the same meanings as commonly understood by those of ordinary skill in the art to which the inventive concept belongs after understanding the inventive concept. Unless explicitly defined as such herein, terms (such as those defined in general dictionaries) should be interpreted as having meanings consistent with their meanings in the context of the relevant field.

Figure 1:
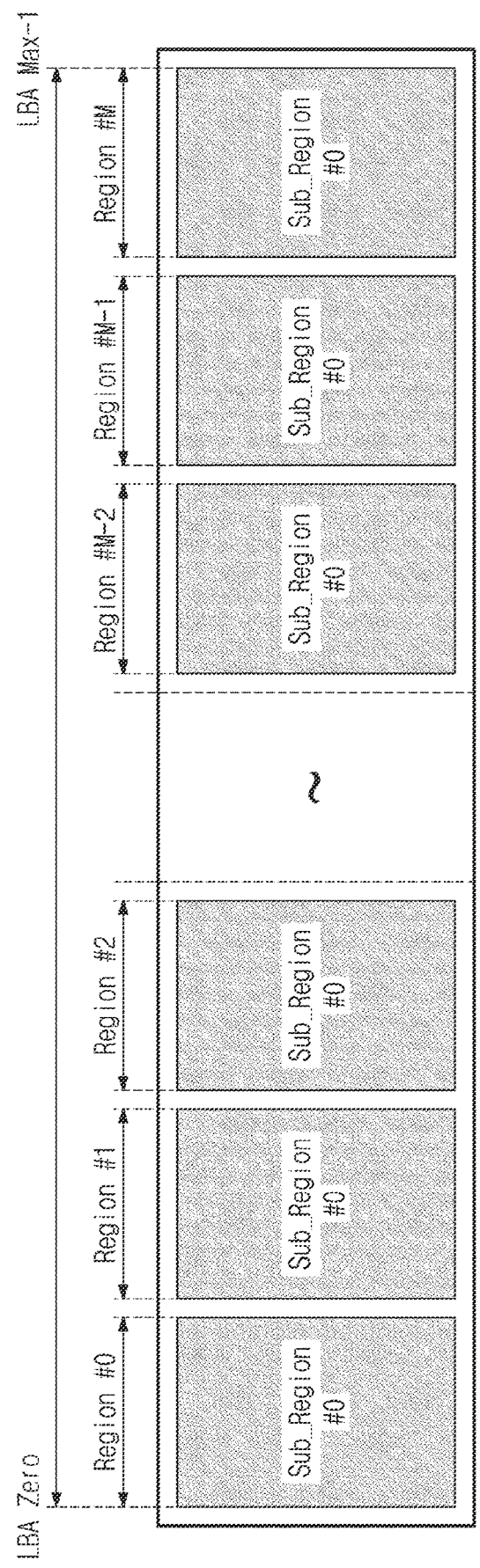
FIG. 1 is a conceptual diagram illustrating a data area structure for a Universal Flash Storage (UFS)
Figure 2:
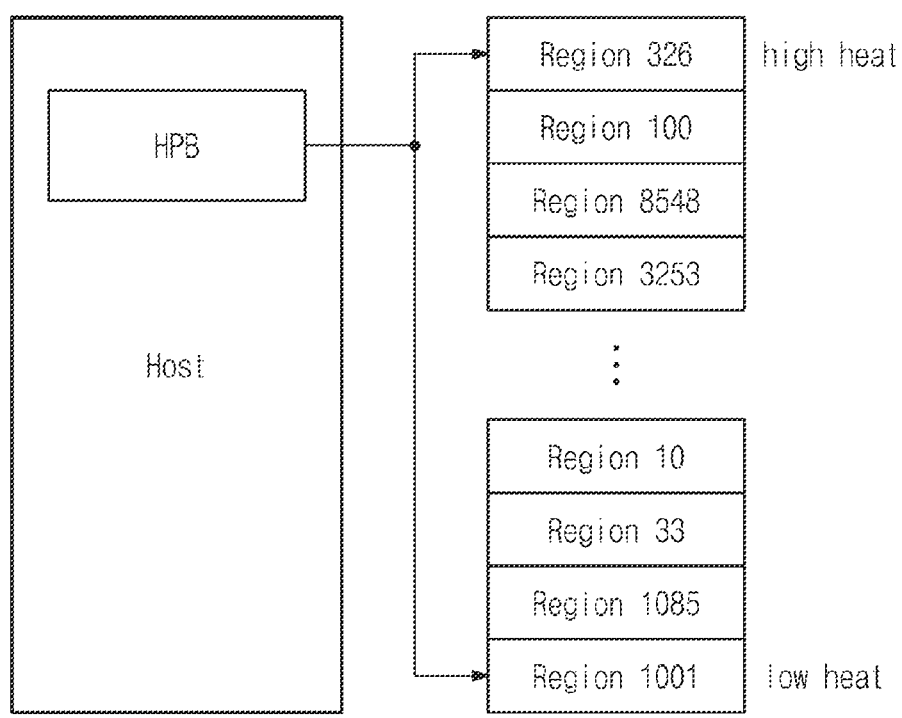
FIG. 2 is a block diagram illustrating management of various regions on the host side by a host device.

FIG. 1 is a conceptual diagram illustrating a data area structure, including various data storage regions (hereafter, "region(s)"), associated with a Universal Flash Storage (UFS), and FIG. 2 is a block diagram illustrating management of various UFS regions on by a host device.

Referring to FIG. 1, a UFS may be understood as managing data according to various regions, and various data is stored in the UFS according to designated physical address(es). In this regard, 4 KB of data managed by the UFS may be termed a "page", whereas 4K of data managed by a host may be termed a "block." Each page may correspond to a physical address, and each block may correspond to a logical block address (LBA).

Each region may contain a sub-region (e.g., a sub-region containing 4K pages). Here, the UFS data area structure of FIG. 1 corresponds to a HPB 2.0 version having a LBA range extending from LBA Zero to LBA Max-1 and being divided into a plurality of regions (e.g., region #0 to region #M), wherein each region includes a Sub-Region #0.

In this regard, a LINUX virtual file system may access data using a logical address. The UFS stores a logical address-to-physical address (L2P) table (i.e., a logical address to physical address correspondence table) for each page.

"Target data" may be accessed using a physical address indicating a location in the UFS at which the target data is stored. However, the target data may be assigned a logical address in the host. Therefore, a particular region storing the target data may be quickly identified and acquired using the L2P table to obtain the corresponding physical address. In some embodiments, the L2P table may be stored in the UFS.

As will be appreciated by those skilled in the art, the host performance booster (HPB) optimizes the process of obtaining the physical address from the logical address. Here, in a cache (e.g., a Dynamic Random Access Memory or DRAM), a dynamic mirror of "heat" (i.e., data access frequency) information may be is created in relation to the L2P table, such that certain data read operations "hit" (i.e., identified) by the HPB may directly obtain a physical address associated with a read operation from the cache DRAM, thereby eliminating the process for obtaining the physical address from the UFS device. This feature improves the performance of data reading.

However, the foregoing approach—that is, the use of the HPB with the UFS may cause a number of problems.

For example, the approach primarily adopts two schemes to update a physical address cached in the host. In a first scheme, a certain region may be identified by the heat information only after it has been accessed multiple times (e.g., referring to a ranking from high heat to low heat shown in FIG. 2, region 326, region 100, region 8548 and region 3253 which exhibit high heat may be designated as "heat regions"). According to a caching strategy of the UFS device, physical addresses associated with high heat data may be provided to the host for caching. However, as may be seen from the foregoing analysis of HPB operation, HPB may only function appropriately in relation to high heat data after caching. Therefore, when the physical address of a particular region is not loaded into the cache, the physical address corresponding to the logical address of the read request cannot be found in the cache based on the HPB, thereby resulting in a relatively low read ratio for the HPB. And as a result, the optimization effect intended by the use of the HPB will not be reflected when data is accessed for the first time.

In a second scheme, when a certain region has just been accessed, the physical address of the region (e.g., region 10, region 33, region 1085 and region 1001 shown in FIG. 2) may be actively obtained. This ensures that each reading is an HPB read operation, but if a region is read only once, the loading of its physical address into cache will result in wasted cache resources.

In view of the foregoing, and assuming the use of an operating system based on a UNIX-like operating system (e.g., a LINUX system or an Android system based on LINUX), a number of regions involved in different processes may be limited and the range may, therefore, be relatively fixed. Therefore, a "process" (or operational) dimension may be introduced to evaluate, at the same time, the heat (or relative heat) of various regions. In this regard, historical (or previously obtained) heat information associated with the regions and obtained in relation to a particular process may be saved according to a basic "process unit", such that when a process begins, a corresponding region may be loaded in advance according to the historical heat information, thereby achieving a high read ratio for the HPB while ensuring that the cached region will be frequently accessed in the future.

Figure 3:
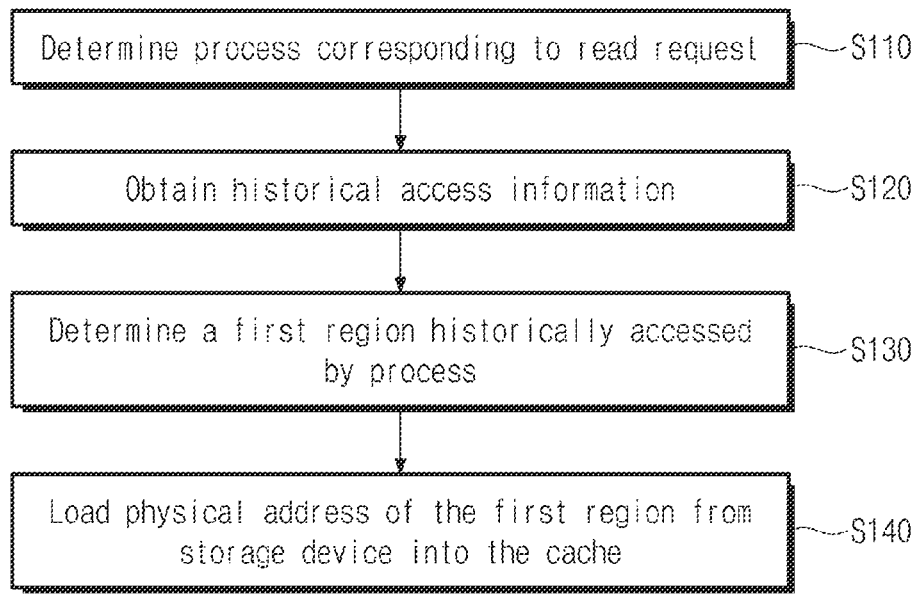
FIG. 3 is a flowchart illustrating a data caching method according to embodiments of the inventive concept.

FIG. 3 is a flowchart illustrating a method of caching data according to embodiments of the inventive concept. The method of caching data may be performed by a data caching device, like those described hereafter. That is, the method steps described hereafter may be performed by a process management unit of a data caching device.

Referring to FIG. 3, a process corresponding to the read request may be determined in response to a read request communicated from the host (S110). In this methodology context, a smart phone will be assumed as an exemplary host, and a particular approach will be described in this context recognizing that a variety of other hosts might alternately be used (e.g., a tablet computer, a watch, wearable technology, etc.).

Accordingly, when a user initiates launch of a particular application once the host is in powered-on state, a "process" is deemed to have started. Thus, when the application issues a read request, the process management unit (described hereafter) may determine the process in response to the read request communicated by the host. Alternately, according to a process creation mechanism associated with an operating system (e.g., an Android system) of the host, the operating system may assign different process names to corresponding processes, such the corresponding process may be determined by obtaining the process name indicated by the read request.

Once the process corresponding to the read request has been determined, historical access information for the process may be obtained (S120). Here, the historical access information may be obtained in relation to historical process information stored in a cache. The historical process information may include historical access information for at least one process. The historical access information may include heat information for one or more regions in relation to previous data accesses the process (or by each one of the processes).

For example, the historical access information may include a process name, identification (ID) of one or more regions historically accessed by the process, heat information for each region among the one or more regions historically accessed by the process, heat information for each region historically accessed by each process among a plurality of processes, etc.

Here, historical process information may be loaded to a cache (e.g.) from the UFS or the host upon power-up.

Thus, in some embodiments, the method step (S120) of obtaining the historical access information may include: (1) obtaining historical access information for the process corresponding to the read request from the historical process information stored in the cache, if the read request is a first read request associated with the corresponding process following power-up of the host; or (2) loading a physical address for a region including a physical address not-cached in the cache, if the read request is not a first read request associated with the corresponding process following power-up of the host. In this second alternative, the region including the physical address not-cached in the cache, may be a region accessed (or indicated) by the read request, and heat information for the region including the physical address not-cached in the cache satisfies the first preset condition. Here, it should be noted the determination of a "first" read request may be made in relation to any reasonable, arbitrary point in time (e.g., the power-on of the host, given the fact that the process management unit may load the historical process information from the storage device to the cache upon power-on of the host).

For all "non-first" read requests of the corresponding process following the first read request, the process management unit may determine whether there is the region including the physical address that is not cached in the region accessed by the read request. This determination may be made by searching cached physical addresses or a number of methods well recognized by those skilled in the art.

Upon determining that there is the region of which the physical address is not cached, it may be further determined whether the heat information of the region of which the physical address is not cached satisfies the first preset condition. Then, upon determining that the heat information of the region of which the physical address is not cached satisfies the first preset condition, the physical address of the region of which the physical address is not cached is loaded into the cache.

As noted above, for the "first" read request of the corresponding process, the historical access information may be directly obtained from the cache to determine physical addresses of which first regions need to be cached. Compared with conventional approaches wherein the data to be cached may be determined only after reading data multiple times in the memory or from other storage devices, the approach provided by embodiments of the inventive concept greatly improves efficiency of data reading.

For non-first read requests, it is necessary to determine whether there is the region of which the physical address is not cached in the region accessed by the read request, and if it exists, the historical access information of the corresponding process may be updated, the physical address of the region of which the physical address is not cached and that satisfies the first preset condition is loaded into the cache, and the content to be cached is quickly determined, thereby improving the efficiency of data reading.

Here, it should be noted that the steps of updating the historical access information of the corresponding process and determining whether the region of which the physical address is not cached satisfies the first preset condition may be performed in any order, and the updating may be first performed and then the determining may be performed, or the determining may be first performed and then the updating may be performed. However, the inventive concept is not limited thereto.

Further, the method of determining "whether the read request of the corresponding process following power-on of the host is the first read request" may include, but is not limited to, setting a status bit (status) in the process information to indicate whether the read request of the corresponding process is the first data read request or the non-first data read request. For example, for the first data read request, the status bit (status) may be set to 1, and for the non-first data read request, the status bit (status) may be set to 0.

Once the historical access information has been obtained (S120), a "first region" historically accessed by the process corresponding to the read request, and for which heat information satisfies the first preset condition, is determined (S130). This determination of a first region may be made according to the historical access information for the process corresponding to the read request.

Here, it should be noted that the "first preset condition" may be require that the heat of a region in the heat ranking of all the regions for the process meet a preset ranking threshold, or a number of times the process accesses the region is greater than a preset number of times threshold. Here, for example, the preset ranking threshold may be the top three regions, the top five regions, etc., or a preset number of times threshold may be 3 times, 5 times, etc. However, these are just illustrative examples.

The first region may be determined in a variety of ways. For example, the process management unit may use IDs for one or more regions historically accessed by the process and count the number of times the region has been accessed, and use the region of which the number of access times is greater than the preset number of times threshold as the first region. Alternately, the heat information for each region may be used to calculate the heat ranking of the regions associated with the corresponding process, and the region whose ranking meets the preset ranking threshold may be determined as the first region based on the ranking.

By performing method steps S110 to S130 of FIG. 3, the effect of taking into account the high read ratio of HPB while ensuring that the cached region will be frequently accessed in the future may be achieved. Referring to the block diagram of FIG. 5, when a process 10 begins, according to the historical process information, the process 10 may access data in region 352, region 854, region 1998, region 10, and region 5 during running Because the heat of the region 5 is relatively low, it means that during the running of the process 10, the data read and write for the region 5 is not very frequent, so only the physical addresses of the first four regions (i.e., region 352, region 854, region 1998, region 10) are loaded. This not only ensures that the read ratio of the HPB may not be too low, but also avoids the wasting of cache resource due to the loading of the region 5.

Once the first region has been determined (S130), the physical address of the first region may be loaded from the storage device into the cache (S140). Here, the cache management unit may be used to perform method step S140 in any suitable manner.

For example, since there may be cases wherein two or more processes access the same region when running, it is necessary to determine whether the physical address of the first region exists in the cache before performing the loading step, thereby avoiding repeated loading steps and improving the efficiency. A cache list (or cache table) of physical address(es) possibly associated with the first region has already been loaded in the cache, so it may be determined whether the physical address of the first region is already in the cache by querying the cache table.

The cache management unit may add a number of the first region to a command of a cache physical page table, the UFS device feedbacks the physical address corresponding to the first region to the host in response to the command, and caches the physical address of the corresponding first region, thereby implementing the method step of loading the physical address of the first region from the storage device into the cache (S140).

The method of data caching provided by certain embodiments of the inventive concept may include one or more of the following steps, as performed (e.g.) by the process management unit.

Alternately from the foregoing, the historical access information for the process corresponding to the read request in the historical process information may be updated according to the region accessed by the read request. In this regard, the "updating" may be achieved in the following ways:

if there is no historical access information for the process corresponding to the read request in the historical process information, access information of the process corresponding to the read request may be added to the historical process information, wherein the access information of the process corresponding to the read request includes heat information of the region accessed by the read request;

if the historical access information for the corresponding process includes the region accessed by the read request, the heat information of the region accessed by the read request is updated; and if a region not included in the historical access information for the corresponding process exists in the region accessed by the read request, heat information for the region may be added into the historical access information.

In relation to the foregoing, a cache algorithm may be used to update the number of times the corresponding process is started, or update the number of times the region involved in the read data request in the corresponding process is accessed. The caching algorithm may include, but is not limited to, Least Frequently Used (LFU), Least Recently Used (LRU), and First In First Out (FIFO). The more times the corresponding process is started, the higher its heat is, and the higher the heat ranking of the corresponding process in each historical process is. Similarly, the more times the region involved in the corresponding process is accessed, the greater its heat becomes, and the greater the heat ranking of the region involved in the corresponding process becomes.

Assuming an "updated" (in the foregoing context) historical access information, the determining of the first region historically accessed by the process corresponding to the read request and of which the heat information satisfies the first preset condition (S130) may include determining the first region historically accessed by the process corresponding to the read request and of which the heat information satisfies the first preset condition according to updated historical access information for the process.

In some embodiment, following power-off of the host, the historical process information stored in the cache may be transferred and stored the UFS as historical process information for when the host is again powered-up.

Figure 6:
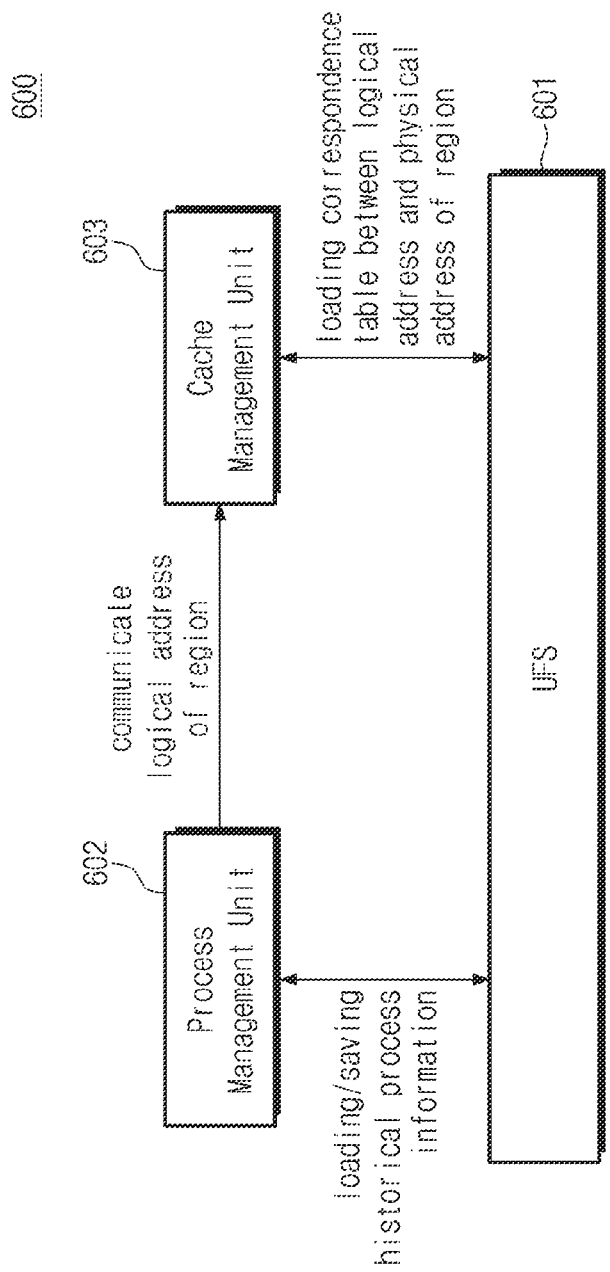
FIG. 6 is a conceptual diagram further illustrating operation of a data caching device according to embodiments of the inventive concept.

FIG. 6 is a conceptual diagram further illustrating operation of a data caching device according to embodiments of the inventive concept.

Referring to FIG. 6, historical process information may be stored in a storage device 601 (for example, UFS) by a process management unit 602. Here, the host may directly load the historical process information upon power-on. Then, in response to a determination of a process corresponding to a read request for each historical process, a physical page table of the relatively heat region for the corresponding process may be loaded in advance. That is, the physical page table may be pre-loaded, thereby increasing the speed of data reading.

Figure 4:
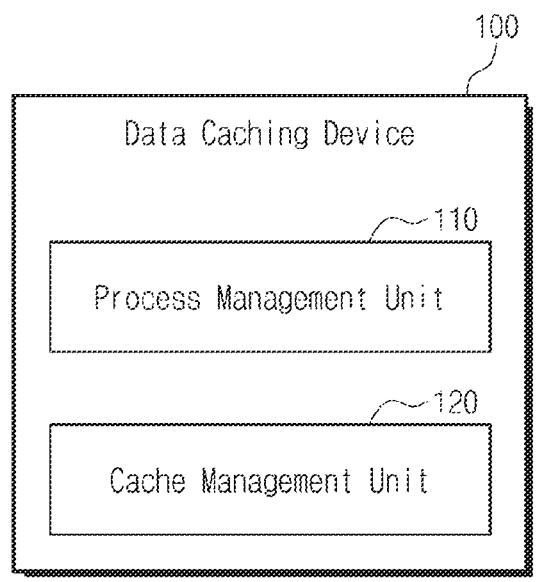
FIG. 4 is a block diagram illustrating a data caching device according to embodiments of the inventive device.

Thereafter, the data caching method described in relation to the flowchart of FIG. 3 may be performed by a cache management unit 120 of FIG. 4.

Alternately, after the physical address is loaded into the cache, the heat ranking of the physical addresses in the cache is updated; when the remaining storage space of the cache is less than a preset storage space threshold, the physical address of which the heat is less than the preset threshold is deleted. The method of updating the heat ranking of the physical addresses in the cache may be to use the cache algorithm to update the number of times the physical addresses in the cache are accessed.

The use of heat ranking to optimize the storage space of the cache is conducive to improve the effective utilization of the cache. The caching algorithm may include, but is not limited to, Least Frequently Used (LFU), Least Recently Used (LRU), and First In First Out (FIFO). The inventive concept does not limit the preset storage space threshold and the preset threshold, and the preset storage space threshold and the preset threshold may be set according to requirements.

Based on the above description, the data caching method provided by embodiments of the inventive concept may load the physical page table of the relatively heat region in the process corresponding to the read request in advance, so that the read ratio of the HPB in all read operations is high, and it is guaranteed that the cached region will be frequently accessed subsequently, which improves the running speed of the process corresponding to each read request, thereby improving the running speed of the host system and enhancing the user experience.

FIG. 4 is a block diagram illustrating a data caching device 100 according to embodiments of the inventive device. Here, the data caching device 100 may include a process management unit 110 and a cache management unit 120, and the process management unit 110 and the cache management unit 120 may be communicatively coupled.

The process management unit 110 may be configured to determine a process corresponding to the read request in response to a read request communicated from the host; acquire historical access information of the process corresponding to the read request according to historical process information in a cache, wherein the historical process information includes historical access information of at least one process, and the historical access information of each process includes heat information of one or more regions that are historically accessed by each process; determine, according to the historical access information of the process corresponding to the read request, a first region where heat information that is historically accessed by the process corresponding to the read request satisfies a first preset condition. The cache management unit 120 may be configured to load a physical address of the first region from a storage device into the cache.

Alternately, the process management unit 110 is configured to load the historical process information from the storage device into the cache after the host is started.

Alternately, the process management unit 110 is configured to update the historical access information of the process corresponding to the read request in the historical process information according to a region accessed by the read request.

Alternately, the process management unit 110 is configured to determine, according to the updated historical access information of the process corresponding to the read request, the first region that is historically accessed by the process corresponding to the read request and of which the heat information satisfies the first preset condition.

Alternately, the process management unit 110 is configured to add access information of the process corresponding to the read request into the historical process information if there is no historical access information of the process corresponding to the read request in the historical process information, wherein the access information of the process corresponding to the read request includes heat information of the region accessed by the read request; update the heat information of the region accessed by the read request if the historical access information of the corresponding process includes the region accessed by the read request; add heat information of a region that is not included in the historical access information of the corresponding process into the historical access information if the region exists in the region accessed by the read request.

Alternately, the process management unit 110 is configured to store the historical process information that is in the cache in the storage device when the host is shut down.

Alternately, the process management unit 110 is configured to acquire the historical access information of the process corresponding to the read request from the historical process information stored in the cache if the read request is a first data read request of the corresponding process after the host is started.

Alternately, the cache management unit 120 is configured to load a physical address of a region of which the physical address is not cached into the cache if the read request is a non-first data read request of the corresponding process after the host is started, and the region of which the physical address is not cached exists in a region accessed by the read request, and heat information of the region of which the physical address is not cached satisfies the first preset condition.

Alternately, the historical access information includes: a process name, IDs of one or more regions that are historically accessed by the process, and the heat information of each region.

Alternately, the historical access information further includes heat information of the process.

One approach to the data caching method and/or data caching device consistent with embodiments of the inventive concept will be described hereafter in relation to FIGS. 5 and FIG. 6.

Referring to FIG. 6, a host 600 may include a storage device (e.g., a UFS device) 601, a central processing unit (CPU) (not shown), and a cache (e.g., a DRAM) (not shown). When the host 600 is powered-on, a process management unit 602 and a cache management unit 603 may be implemented by the computational/logic resources of the CPU and the data storage resources of the DRAM and the UFS 601. Thus, the process management unit 602 may load historical process information from the UFS 601 upon power-up the host, and store (or update) the historical process information during the operation of the host to the UFS 601.

After the process management unit 602 performs the method described above with reference to FIG. 3 (e.g., at least method steps S110 to S130), it may communicate a logical address of the determined first region (e.g., a region historically accessed by the process corresponding to the read request and of which heat information satisfies the first preset condition) to the cache management unit 603 using an appropriate communication protocol. Here, the cache management unit 603 and the UFS device 601 may be connected via a wireless mode and/or a wired mode.

In response to receiving the logical address of the first region, the cache management unit 603 may load the corresponding physical page table from the UFS 601 based on the L2P table.

Figure 5:
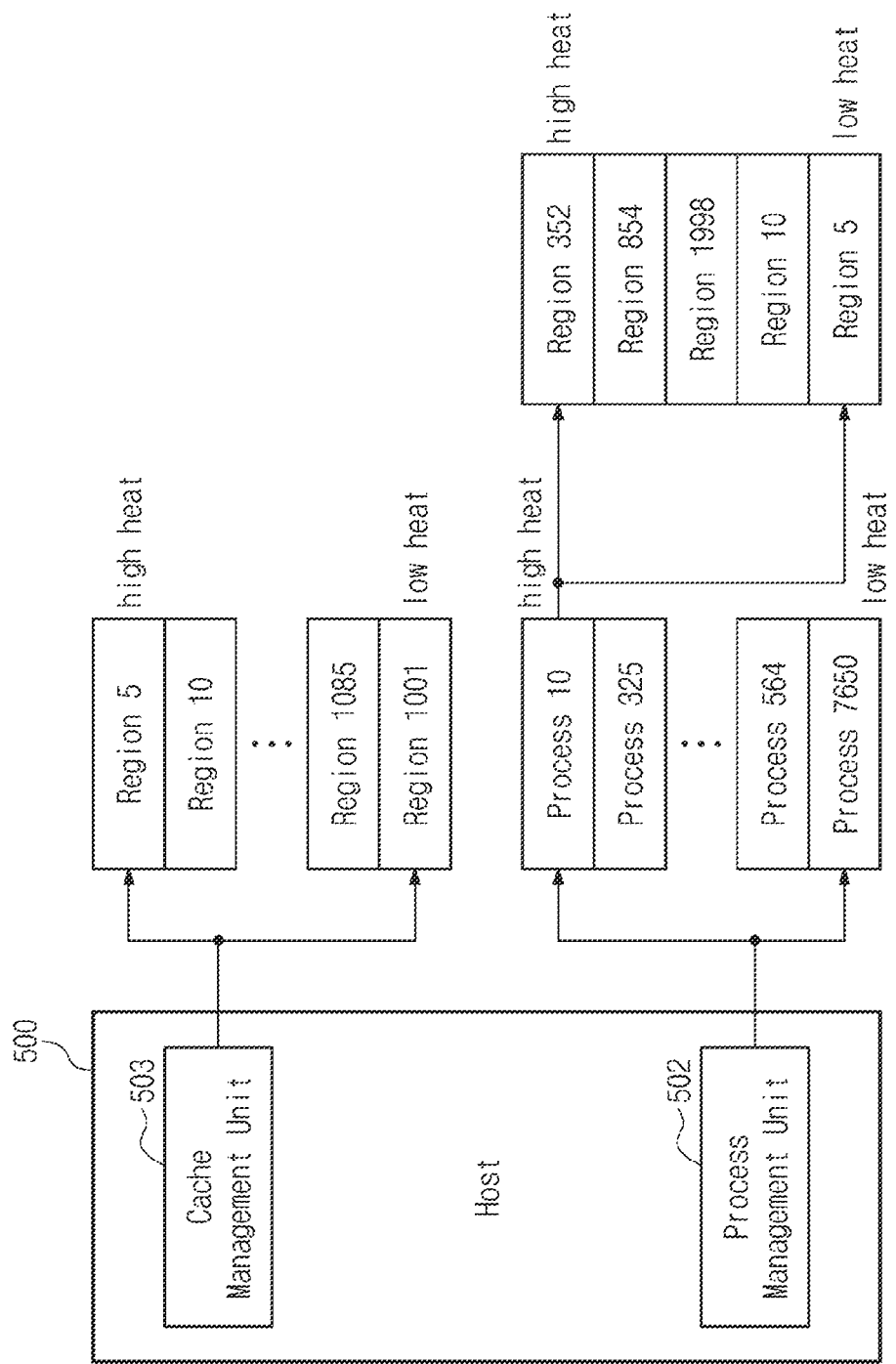
FIG. 5 is a block diagram illustrating the use of a data caching method according to embodiments of the inventive concept, as applied to the management of various regions on the host side.

Referring to FIG. 5, the host side (e.g., a CPU) 500 may set the data caching device, and the process management unit 502 may update the heat of each historical process involved in the historical process information by using the above caching algorithm, according to the corresponding process of the read request, for example, the process corresponding to the read request is the process 10, which has been started the most times at present, so its heat is the highest, and its ranking is updated to the first place, and the ranking of other processes is adjusted accordingly, such as process 325, process 546 and process 7650 is adjusted downward accordingly.

The process management unit 502 may update the heat of the region involved in the process corresponding to the read request by using the above caching algorithm and/or machine learning algorithm according to the region involved in the corresponding process, if the process corresponding to the read request exists in each historical process. In the case where there is no process corresponding to the read request in each historical process, process information of the process corresponding to the read request is stored.

Referring to FIG. 5, taking the process 10 corresponding to the read request existing in each historical process as an example, the heat ranking may be determined according to the number of times the region involved in the process is accessed. In the illustrated embodiment of FIG. 5, the heat ranking is region 352, region 854, region 1998, region 10, and region 5 from high to low.

The cache management unit 503 may also update the heat of the region of the loaded physical page table based on the above cache algorithm and/or machine learning algorithm, and rank accordingly. Here, the case where different processes may access the same region is taken into account when updating. For example, the process 10 accesses regions 5 and 10, and the process 325 accesses regions 5 and 1001. Here, it may be determined that the region 5 has been accessed twice, and the current heat is the highest, the region 5 is ranked to the first place. Similarly, other regions are adjusted accordingly, for example, the rankings of the region 10, . . . , region 1085, and region 1001 are adjusted down accordingly.

Since the storage space of the cache is limited, the cache storage space may be optimized according to the rankings of the loaded regions by the cache management unit 503, thereby improving the effective utilization of the cache.

Figure 7:
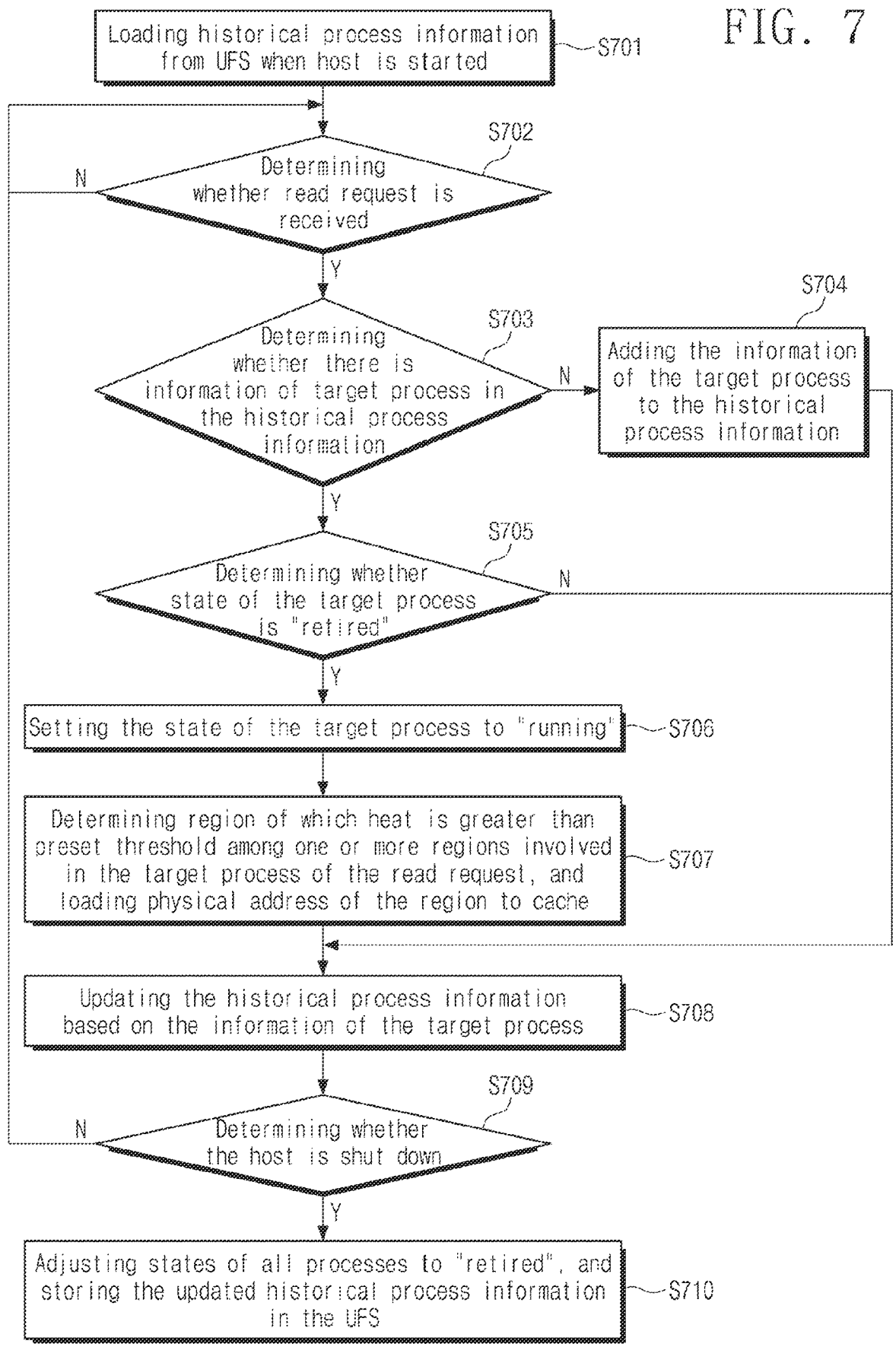
FIG. 7 is a flowchart illustrating another data caching method according to embodiment of the inventive concept.

The following describes a specific embodiment of a working process for the data caching method and/or device consistent with embodiments of the inventive concept with reference to the flow chart of FIGS. 6 and 7. Here, for ease of description, the process corresponding to the read request will be denoted as the "target process of the read request."

S701: when the host is powered-on, the process management unit 602 loads the historical process information from the UFS 601;

S702: the process management unit 602 determines whether a read request is received, and if so, further determines whether there is information about the target process of the read request in the historical process information, and if not, then returns;

S703: if the process management unit 602 determines that the target process of the read request exists in the historical process information, it further determines whether the state of the target process is "retired"; if the process management unit 602 determines that the target process of the read request does not exist in the historical process information, then the information of the target process is added to the historical process information;

S704: if the state of the target process is retired, the process management unit 602 adjusts the state of the target process to a "running state;"

S705: the process management unit 602 determines the region (i.e., the first region) of which heat is greater than a preset threshold among one or more regions involved in the target process of the read request, and then communicates the corresponding logic address to the cache management unit 603, and the cache management unit 603 loads the corresponding physical address from the memory (for example, UFS 601) in response to the logical address;

S706: the process management unit 602 updates the heat ranking of the target process in each historical process based on the number of times the target process is started, and updates the heat ranking of the regions in the target process based on the number of times the region is accessed by the target process;

S707: the process management unit 602 determines whether the host is powered-down, and if so, adjusts the states of all processes to retired; at the same time, stores the updated historical process information in the memory (for example, UFS 601) as the historical process information at the next startup; if not, returns to the step S702.

With reference to the embodiment of FIG. 7 above, it can be seen that the data caching method and/or device according to embodiments of the inventive concept evaluates the heat of the region by introducing a "process" dimension, and meanwhile uses the "process" as the basic unit to save and update the historical heat rankings of the regions involved in the process, pre-loads the high heat region into the cache to take into account the read ratio of the HPB and the effective utilization of cache resources at the same time.

It should be understood that each unit/module in the device of data caching according to embodiments of the inventive concept may be implemented in hardware and/or software. That is, those skilled in the art may variously implement each of the foregoing units/modules using (e.g.) a field programmable gate array (FPGA) and/or an application specific integrated circuit (ASIC).

In other embodiment of the inventive concept, computer-readable storage medium may be provided, wherein one or more program(s) may be used to perform one or more of the foregoing method steps.

For example, the method of data caching according to embodiments of the inventive concept may be written as a computer program, code segment, instruction or any combination thereof, and recorded, stored or fixed in one or more non-transitory computer-readable storage medium or on one or more non-transitory computer-readable storage medium. The computer-readable storage medium is any data storage device that can store data read by a computer system. Examples of the computer-readable storage medium include a read-only memory, a random access memory, read-only optical disks, magnetic tapes, floppy disks, optical data storage devices, and carrier waves (such as data transmission through the Internet via a wired or wireless transmission path).

Figure 8:
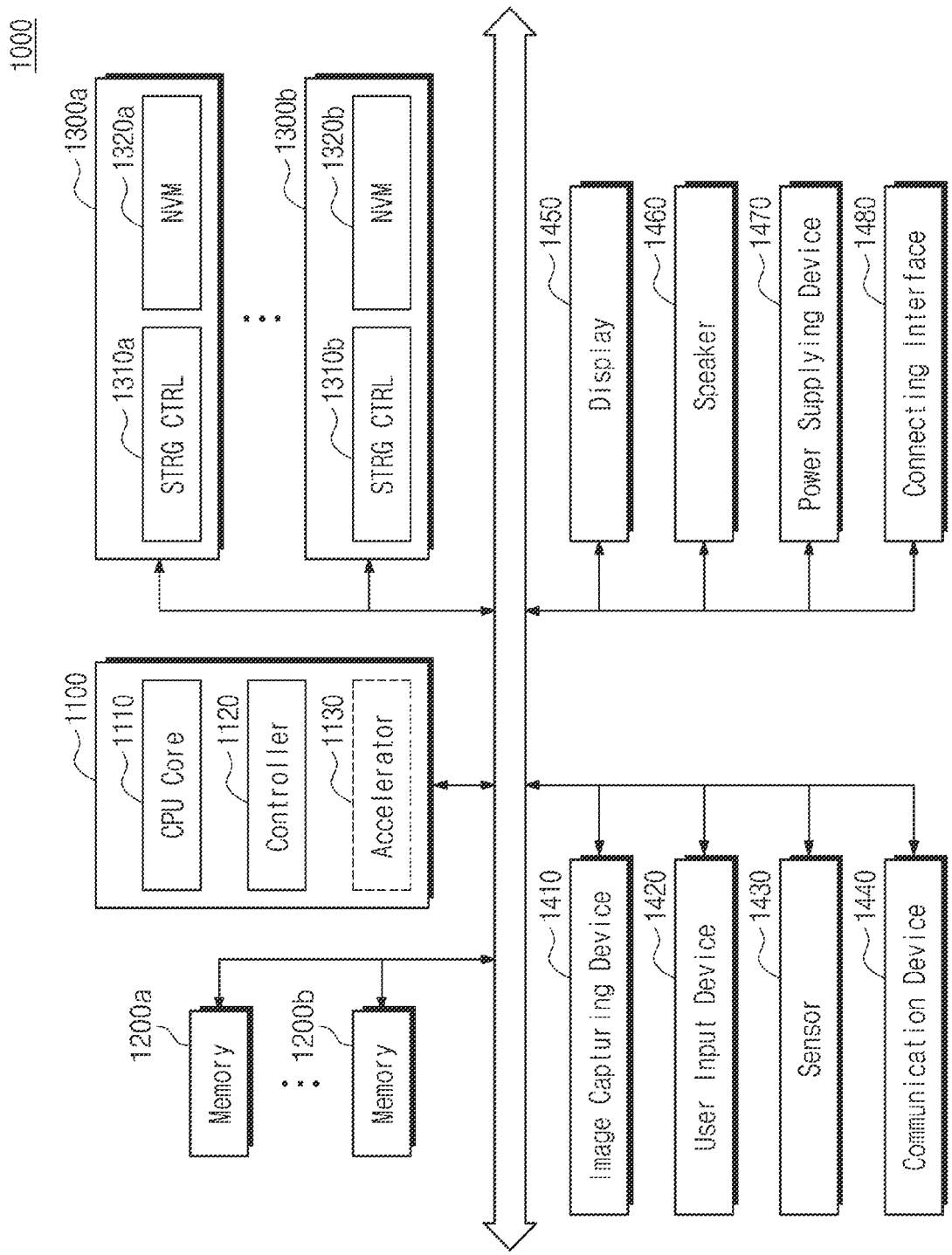
FIG. 8 is a block diagram illustrating a system that may include a storage device according to embodiments of the inventive concept.

FIG. 8 is a block diagram illustrating a system 1000 to which a storage device according to embodiments of the inventive concept may be applied. The system 1000 of FIG. 8 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 8 is not necessarily limited to the mobile system and may be a PC, a laptop computer, a server, a media player, or an automotive device (e.g., a navigation device).

Referring to FIG. 8, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

In some embodiments, the main processor 1100 may include the data caching device 100 of FIG. 4. The main processor may perform the method of caching data described in relation to FIGS. 3, 4, 5, and 6, to control the UFS device (e.g., the storage device 1300*a*).

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

In some embodiments, the memory 1200*a* (or the memory 1200, or both of them) may be operated as the DRAM for supporting HPB. For example, the memory 1200*a* may store at least a part of the L2P mapping table which is stored in a UFS device (e.g., the storage device 1300*a*). In other words, the physical address of some heat data may be cached in the memory 1200*a*.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory)s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 9:
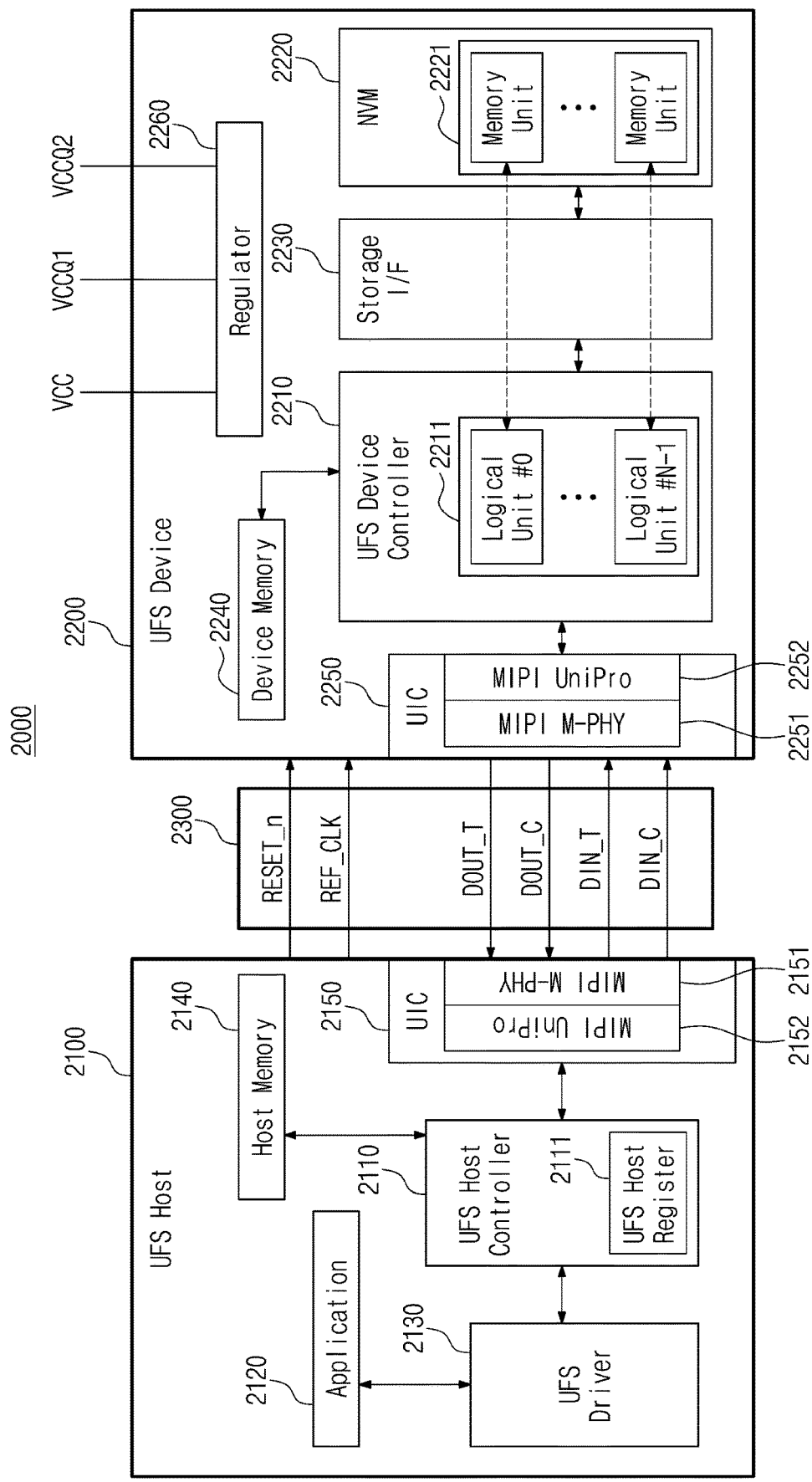
FIG. 9 is a block diagram illustrating a UFS system that may include a storage device according to embodiments of the inventive concept.

FIG. 9 is a block diagram illustrating a UFS system 2000 according to embodiments of the inventive concept. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 8 may also be applied to the UFS system 2000 of FIG. 9 within a range that does not conflict with the following description of FIG. 9.

Referring to FIG. 9, the UFS host 2100 may be connected to the UFS device 2200 through the UFS interface 2300. When the main processor 1100 of FIG. 8 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 8. The UFS device 2200 may correspond to the storage device 1300a and 1300b of FIG. 8, and a UFS device controller 2210 and an NVM 2220 may respectively correspond to the storage controllers 1310a and 1310b and the NVMs 1320a and 1320b of FIG. 8.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

In some embodiments, the UFS host 2100 may further include the data caching device 100 of FIG. 4. The UFS host 2100 may perform the method of data caching as described above. In some embodiments, the UFS host 2100 may execute instructions stored in the host memory 2140 to perform the method of data caching as described above.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 9, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 9, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

As noted above, by introducing the "process" management, the historical process information may be used to obtain the historical access information of the process corresponding to the read request, and then the first region of which the heat information satisfies the first preset condition is determined, and then the physical address of the first region is loaded into the cache, that is, the physical page table of the heat region in the process corresponding to the read request to be started is loaded in advance, which may make the read ratio of the HPB in all read operations being high, and ensure that the cached region will be frequently accessed in the future, improve the running speed of the process corresponding to each read request, thereby improving the running speed of the host system and enhancing the user experience.

Alternately, the method may further include loading the historical process information from the storage device into the cache upon power-up of the host.

As noted above, the host may load the historical process information after being started, which introduces management data for the process management, so that it is convenient to subsequently determine whether the region involved in the read request exists in the cache based on the historical process information.

Alternately, the method further includes updating the historical access information of the process corresponding to the read request in the historical process information according to a region accessed by the read request.

Alternately, the updating the historical access information of the process corresponding to the read request in the historical process information may include; adding access information of the process corresponding to the read request into the historical process information if there is no historical access information of the process corresponding to the read request in the historical process information, wherein the access information of the process corresponding to the read request includes heat information of the region accessed by the read request, updating the heat information of the region accessed by the read request if the historical access information of the corresponding process includes the region accessed by the read request; adding heat information of a region that is not included in the historical access information of the corresponding process into the historical access information if the region exists in the region accessed by the read request.

As noted above, the updated historical access information relates to the access information of the process corresponding to the read request and the heat information of the region involved in the read request, those information may be used as the historical access information to be loaded when the host is started next time, thereby ensuring the continuity and validity of the historical access information as process management support data.

Alternately, the determining, according to the historical access information of the process corresponding to the read request, the first region that is historically accessed by the process corresponding to the read request and of which the heat information satisfies the first preset condition includes: determining, according to the updated historical access information of the process corresponding to the read request, the first region that is historically accessed by the process corresponding to the read request and of which the heat information satisfies the first preset condition.

It should be noted that the updating of historical access information may be made in real-time, such the first region determined by the updated historical access information may is accurately determined.

Alternately, the method may further include storing the historical process information in the cache in the storage device upon power-down of the host.

As noted above, the cache (e.g., a, DRAM) usually has the characteristics of data loss during power down. Therefore, storing the data in the cache to the storage device (for example, UFS) when the device is shut down may ensure that the data is not lost, which is convenient for loading at the next startup.

Alternately, the acquiring the historical access information of the process corresponding to the read request according to the historical process information in the cache includes acquiring the historical access information of the process corresponding to the read request from the historical process information stored in the cache if the read request is a first data read request of the corresponding process after the host is started.

Alternately, the method may further include; loading a physical address of a region of which the physical address is not cached into the cache if the read request is a non-first data read request of the corresponding process after the host is started, and the region of which the physical address is not cached exists in a region accessed by the read request, and heat information of the region of which the physical address is not cached satisfies the first preset condition.

As noted above, for the "first" data read request of the corresponding process, the historical access information may be directly obtained from the cache to determine physical addresses of which first regions need to be cached. Compared with conventional approaches in which the information/data to-be-cached may be determined only after reading data multiple times in the memory or other storage devices, embodiments of the inventive concept may improve the efficiency of data reading.

For "non-first" read data requests, it is necessary to determine whether there is the region of which the physical address is not cached in the region accessed by the read request, and if it exists, the historical access information of the corresponding process is updated according to the above steps, the physical address of the region of which the physical address is not cached that satisfies the first preset condition is loaded into the cache, and the content to be cached is quickly determined, thereby improving the efficiency of data reading.

Alternately, the historical access information may include a process name, IDs of one or more regions that are historically accessed by the process, and the heat information of each region.

Alternately, the historical access information further includes heat information of the process.

According to another aspect of the inventive concept, a device of data caching is provided, the device includes: a process management unit, configured to: in response to a read request transmitted by a host, determine a process corresponding to the read request; acquire historical access information of the process corresponding to the read request according to historical process information in a cache, wherein the historical process information includes historical access information of at least one process, and the historical access information of each process includes heat information of one or more regions that are historically accessed by each process; determine, according to the historical access information of the process corresponding to the read request, a first region that is historically accessed by the process corresponding to the read request and of which heat information satisfies a first preset condition; and a cache management unit, configured to load a physical address of the first region from a storage device into the cache.

Alternately, the process management unit is configured to load the historical process information from the storage device into the cache after the host is started.

Alternately, the process management unit is configured to update the historical access information of the process corresponding to the read request in the historical process information according to a region accessed by the read request.

Alternately, the process management unit is configured to: determine, according to the updated historical access information of the process corresponding to the read request, the first region that is historically accessed by the process corresponding to the read request and of which the heat information satisfies the first preset condition.

Alternately, the process management unit is configured to: add access information of the process corresponding to the read request into the historical process information if there is no historical access information of the process corresponding to the read request in the historical process information, wherein the access information of the process corresponding to the read request includes heat information of the region accessed by the read request; update the heat information of the region accessed by the read request if the historical access information of the corresponding process includes the region accessed by the read request; add heat information of a region that is not included in the historical access information of the corresponding process into the historical access information if the region exists in the region accessed by the read request.

Alternately, the process management unit is configured to store the historical process information that is in the cache in the storage device when the host is shut down.

Alternately, the process management unit is configured to acquire the historical access information of the process corresponding to the read request from the historical process information stored in the cache if the read request is a first data read request of the corresponding process after the host is started.

Alternately, the cache management unit is configured to load a physical address of a region of which the physical address is not cached into the cache if the read request is a non-first data read request of the corresponding process after the host is started, and the region of which the physical address is not cached exists in a region accessed by the read request, and heat information of the region of which the physical address is not cached satisfies the first preset condition.

Alternately, the historical access information includes: a process name, IDs of one or more regions that are historically accessed by the process, and the heat information of each region.

Alternately, the historical access information further includes heat information of the process.

According to another aspect of the inventive concept, a computer-readable storage medium storing instructions is provided, wherein the instructions, when executed by a processor, cause the processor to perform the method of data caching as described above.

According to another aspect of the inventive concept, an electronic device is provided. The electronic device includes at least one processor; and at least one memory storing computer-executable instructions, wherein the computer-executable instructions, when executed by the at least one processor, cause the at least one processor to execute the method of data caching as described above.

The method of data caching and the device of data caching provided by embodiments of the inventive concept may load the physical page table of the heat region in the process to be started corresponding to the read request in advance, so that the read ratio of the HPB in all read operations is high, and it is guaranteed that the cached region will be frequently accessed subsequently, which improves the running speed of the process corresponding to each read request, thereby improving the running speed of the host system and enhancing the user experience.

According to embodiments of the inventive concept, there is provided an electronic device, wherein the electronic device includes: at least one processor; at least one memory storing computer-executable instructions, wherein the computer-executable instructions, when executed by the at least one processor, cause the at least one processor to perform the method of data caching.

Here, the electronic device may broadly be a tablet computer, a smart phone, a smart watch, or any other electronic device that has necessary computing and/or processing capabilities. In an embodiment, the electronic device may include a processor, a memory, a network interface, a communication interface, etc. connected through a system bus. The processor of the electronic device may be used to provide necessary calculation, processing, and/or control capabilities. The memory of the electronic device may include a non-volatile storage medium and internal memory. An operating system, computer program, etc. may be stored in or on the non-volatile storage medium. The internal memory may provide an environment for the operation of the operating system and the computer program in the non-volatile storage medium. The network interface and communication interface of the electronic device may be used to connect and communicate with external devices through network.

Thus, the method of data caching and the device of data caching provided by embodiments of the inventive concept may load the physical page table of the heat region in the process corresponding to the read request to be started in advance, so that the read ratio of the HPB in all read operations is high, and it is guaranteed that the cached region will be frequently accessed in the future, which improves the running speed of the process corresponding to each read request, thereby improving the running speed of the host system and enhancing the user experience.

Although several exemplary embodiments of the inventive concept have been shown and described herein, those skilled in the art will recognize that these embodiments may be modified without departing from the principle and spirit of the inventive concept as defined by accompanying claims and their equivalents.

What is claimed is:

1. A method of data caching, the method comprising:
   identifying a first process from among multiple processes based on a read request communicated from a host and historical process information stored in a cache, the cache storing the historical process information and a logical address-to-physical address (L2P) table, the historical process information comprising historical access information and heat information for each of multiple regions that have been accessed by each of the multiple processes;
   identifying, based on the first process and its corresponding historical access information and heat information, a physical address satisfying a certain condition among physical addresses representing multiple regions that have been accessed by the first process;

loading the identified physical address from a storage device to the cache; and adding the loaded physical address to the L2P table.

2. The method according to claim 1, further comprising loading the historical process information from the storage device to the cache upon power-on of the host.

3. The method according to claim 1, further comprising updating the historical access information for the first process in the historical process information for a region accessed in response to the read request.

4. The method according to claim 3, wherein identifying the physical address satisfying the certain condition includes updating the historical access information for the first process in the historical process information.

5. The method according to claim 4, wherein the updating of the historical access information for the first process in the historical process information includes:

adding access information for the first process to the historical process information, if there is no historical access information for the first process in the historical process information, wherein the access information for the first process includes heat information for the region accessed by the read request, updating heat information for the region accessed by the read request, if the historical access information for the first process includes the region accessed by the read request, and adding heat information for a region not included in the historical access information for the first process into the historical access information, if the region is accessed by the read request.

6. The method according to claim 1, further comprising storing the historical process information in the storage device upon power-off of the host.

7. The method according to claim 1, wherein identifying the physical address satisfying the certain condition includes obtaining the historical access information corresponding to the first process from the historical process information stored in the cache, if the read request is a first read request associated with the first process following power-on of the host.

8. The method according to claim 7, method further comprising loading in the cache:

a physical address of a region if: (1) the physical address of the region is not cached, (2) the read request is not the first read request, and (3) the region is accessed by the read request, and heat information for the region if: (4) the physical address of the region is not cached and (5) the heat information satisfies the certain condition.

9. The method according to claim 1, wherein the historical access information corresponding to each process comprises:

a process name, identifications for one or more regions historically accessed by the process, and the heat information of each of the multiple regions.

10. The method according to claim 1, wherein identifying the physical address satisfying the certain condition includes:

determining, based on the first process and its corresponding historical access information, whether there exists a first physical address that is not cached in the cache from among the physical addresses representing the multiple regions that have been accessed by the first process;

determining, when the first physical address exists, whether a heat rank according to the heat information corresponding to the first physical address is higher than a preset rank based on the first process and its corresponding heat information; and determining, when the heat rank according to the heat information is higher than the preset rank, the first physical address as the physical address satisfying the certain condition.

11. A device performing data caching, the device comprising:

a process management unit configured to:

identify a first process from among multiple processes based on a read request communicated from a host and historical process information stored in a cache, the cache storing the historical process information and a logical address-to-physical address (L2P) table, the historical process information comprising historical access information and heat information for each of multiple regions that have been accessed by each of the multiple processes, and identify, based on the first process and its corresponding historical access information and heat information, a physical address satisfying a certain condition among physical addresses representing multiple regions that have been accessed by the first process; and a cache management unit configured to load the identified physical address from a storage device to the cache, and configured to add the loaded physical address to the L2P table.

12. The device according to claim 11, wherein the process management unit is further configured to load the historical process information from the storage device to the cache upon power-on of the host.

13. The device according to claim 11, wherein the process management unit is further configured to update the historical access information for the first process in the historical process information according to a region accessed by the read request.

14. The device according to claim 13, wherein the process management unit is further configured to identify the physical address satisfying the certain condition according to updated historical access information for the first process.

15. The device according to claim 14, wherein the process management unit is further configured to:

add access information for the first process to the historical process information, if there is no historical access information for the first process corresponding to the read request in the historical process information, wherein the access information for the first process includes heat information for the region accessed by the read request, update heat information for the region accessed by the read request, if the historical access information includes the region accessed by the read request, and add heat information for a region not included in the historical access information to the corresponding historical access information, if the region is accessed by the read request and not included in the historical access information.

16. The device according to claim 11, wherein the process management unit is further configured to store the historical process information in the storage device upon power-down of the host.

17. The device according to claim 11, wherein the process management unit is further configured to obtain the historical access information for the first process from the historical process information stored in the cache, if the read request is a first read request for the first process following power-on of the host.

18. The device according to claim 17, wherein the cache management unit is further configured to load:
   a physical address for a region if: (1) the physical address of the region is not cached, (2) the read request is not the first read request, and (3) the region is accessed by the read request, and
   heat information for the region if: (4) the physical address of the region is not cached and (5) the heat information satisfies the certain condition.

19. The device according to claim 11, wherein the process management unit is configured to:
   determine, based on the first process and its corresponding historical access information, whether there exists a first physical address that is not cached in the cache from among the physical addresses representing the multiple regions that have been accessed by the first process;
   determine, when the first physical address exists, whether a heat rank according to the heat information corresponding to the first physical address is higher than a preset rank based on the first process and its corresponding heat information; and
   determine, when the heat rank according to the heat information is higher than the preset rank, the first physical address as the physical address satisfying the certain condition.

20. A method of data caching in a system including a Universal Flash Storage (UFS), a cache and a host, the method comprising:
   loading historical process information from the UFS to the host upon power-on of the host;
   identifying a first process from among multiple processes based on a read request communicated from a host and historical process information stored in the cache, the cache storing the historical process information and a logical address-to-physical address (L2P) table, the historical process information comprising historical access information and heat information for each of multiple regions that have been accessed by each of the multiple processes the multiple processes;
   identifying, based on the first process and its corresponding historical access information and heat information, a physical address satisfying a certain condition among physical addresses representing multiple regions that have been accessed by the first process;
   loading the identified physical address from the UFS to the cache; and
   adding the loaded physical address to the L2P table.

* * * * *